United States Patent [19]
Corriveau

[11] Patent Number: 6,101,392
[45] Date of Patent: Aug. 8, 2000

[54] REVERSE COMMUNICATION OF MOBILE STATION CALLING SERVICE CAPABILITIES

[75] Inventor: Michel Corriveau, St. Hubert, Canada

[73] Assignee: Telefonaktiebolaget LM Ericsson, Stockholm, Sweden

[21] Appl. No.: 08/955,479

[22] Filed: Oct. 22, 1997

Related U.S. Application Data

[60] Provisional application No. 60/038,400, Feb. 17, 1997.

[51] Int. Cl.[7] .................................................... H04Q 7/00
[52] U.S. Cl. ............................................ 455/458; 455/466
[58] Field of Search ................................ 455/422, 414.4, 455/415.433, 450, 445, 458, 434, 466, 552, 553; 370/321, 327, 329

[56] References Cited

U.S. PATENT DOCUMENTS 5,436,955  7/1995  Kaewell, Jr. et al. .

FOREIGN PATENT DOCUMENTS 0 652 680  11/1994  European Pat. Off. .
0 685 972  4/1995  European Pat. Off. .
WO 98/26625  6/1998  WIPO .

OTHER PUBLICATIONS

TIA/EIA Interim Standard, "800 MHz TDMA Cellular—Radio Interface—Mobile Station—Base Station Compatibility—Digital Control Channel", Dec., 1994, TIA/EIA/IS–136.1, pp. 163 and 176.

TIA/EIA Interim Standard, "800 MHz TDMA Cellular—Radio Interface—Mobile Station—Base Station Compatibility—Traffic Channels and FSK Control Channel", Dec., 1994, TIA/EIA/IS–136.2, p. 228.

PCT International Search Report, Dec. 2, 1998, PCT/SE 98/00261.

*Primary Examiner*—Thanh Cong Le
*Attorney, Agent, or Firm*—Jenkens & Gilchrist, P.C.

[57] ABSTRACT

A mobile station sends information concerning mobile station supported calling services to a serving switching node using a reverse digital traffic channel (DTC) message. With respect to data calling services, the DTC message includes information identifying whether the mobile station supports, for example, asynchronous data communication, G3Fax communication, half rate DTC communication, double rate DTC communication, triple rate DTC communication, STU-III, or asymmetrical bandwidth communication. In a preferred implementation, a fast associated control channel (FACCH) of the reverse digital traffic channel is used by the mobile station to communicate the supported calling services information. With knowledge of this capability information, a communications network may engage in selective (i.e., intelligent) paging.

14 Claims, 3 Drawing Sheets

REVERSE COMMUNICATION OF MOBILE STATION CALLING SERVICE CAPABILITIES

This application claims benefit of provisional application Ser. No. 60/038,400 filed Feb. 17, 1997.

BACKGROUND OF THE INVENTION

1. Technical Field of the Invention

The present invention relates to cellular telephone networks and, in particular, to the reverse communication of mobile station calling service (data calling) capabilities and the intelligent paging of a mobile station in connection with the termination of an incoming data call.

2. Description of Related Art

Operation of a cellular telephone network to handle an incoming call dialed to a cellular subscriber mobile station is well known. Responsive to receipt at an originating (or gateway) switching node of the incoming call dialed to a mobile station, a location request (send routing) message is sent to the home location register for the dialed mobile station. The home location register then identifies a switching node currently serving the dialed mobile station. A routing request (provide roaming) message is then sent from the home location register to the serving (or visited) switching node to prepare for delivery of the call. The serving switching node then pages for the mobile station within the network. Responsive to a paging acknowledgment, the mobile station is located and the serving switching node assigns an appropriate routing number (for example, a temporary location directory number or a roaming number) for that location. The routing number is then delivered back to the originating switching node via the home location register where it is used to forward the incoming call over a trunk call connection established between the originating switching node and the serving switching node. Delivery of the incoming call to the mobile station from the serving switching node is then accomplished by establishing a connection with a base station currently serving the mobile station. A radio frequency communications link is then established between the base station and the mobile station to carry the connection, and it is over this radio frequency communications link that the incoming call delivery is handled.

Cellular telephone networks utilize a control channel to broadcast control signals within each of the included plurality of cells. In connection with the locating of a mobile station, a paging signal is transmitted over the control channel for certain ones of the cells. In order to provide the greatest likelihood of establishing location, the paging signal must be transmitted within every cell covering the service area of the network. The capacity of the control channel, however, is limited because its data transmission rate is relatively slow and it is used by the network to transmit many control related messages other than paging signals. Paging in every cell is then not an acceptable option as this would adversely affect control channel capacity, and would preclude network paging for multiple mobile stations in a simultaneous manner. Procedures have accordingly been established to utilize the limited capacity of the control channel as efficiently as possible, while at the same time ensuring an acceptable success rate for paging to facilitate call delivery.

One paging procedure that has been successfully utilized is to define a plurality of location areas (LA's) within the service area (SA) of the cellular telephone network. Each location area typically includes a plurality of individual cells. As mobile stations move about the service area, they register with the network each time they enter into a new location area. A record of this registration is kept, and selective paging is performed in each of the cells of the location area where the called mobile station last registered. If the paging signal is not acknowledged by the mobile station, the network next pages in a paging area (PA) which is larger than the location area in which the mobile station last registered, but smaller than the service area. Paging over the entire service area (i.e., global) for a mobile station is performed last, and is preferably implemented only in emergency situations.

Many different kinds of calling services are now being offered by cellular service providers. Conventionally, of course, the calling service of primary use and importance to subscribers has been voice calling. With increased sophistication in the network, and increased demands of subscribers for service variety, other calling services, such as data calling, are now available for subscriber use. Older mobile stations, however, have limited calling service capability such that they can, for example, only make and receive voice calls. With these new calling services being supported by the network, an incoming call implicating a calling service other than voice calling may be directed towards a mobile station that is incapable of providing support to that implicated calling service. In such cases, it would be a waste of limited network communications resources to page for that mobile station in connection with the incoming call.

To address this problem, EIA/TIA Interim Standard IS-136.1 provides a message (i.e., the "Capability Report" message) for mobile station transmission on the random access channel (RACH) of the reverse digital control channel (DCC) at the time of mobile station registration. See, IS-136.1 §6.4.4.5 (12/94). In the DCC Capability Report message, the mobile station supplies the network with information concerning, among other things, its capabilities with respect to supporting calling services such as data services. For data services in particular, using the DCC Capability Report message, the mobile station may identify whether it supports, for example, asynchronous data communication, G3Fax communication, half rate DTC communication, double rate DTC communication, triple rate DTC communication, STU-III, or asymmetrical bandwidth communication. Once the network has knowledge of the supported calling services information, intelligent paging decisions may be made in response to an incoming call implicating one of those services. The network, operating within the context of a conventional call delivery scenario, then evaluates the information provided by a given mobile station in its DCC Capability Report message, and if the mobile station does not provide support for a calling service implicated by an incoming call, no paging is performed and a mobile station not available message is returned to the originating switching node.

When a mobile station is currently being served by a cell having only an analog control channel (ACC) capability, no transport mechanism exists for communicating the mobile station IS-136.1 DCC Capability Report message information concerning supported calling services such as data services. As another concern, the information stored by the network in the subscriber record following receipt of a DCC Capability Report message may subsequently become lost if the subscriber record is recycled. In these situations, the network may not know which calling services are supported by a served mobile station at the time of call delivery. Absent network knowledge of such information, instances may arise where inefficient and unnecessary paging occurs with respect to that mobile station in response to an incoming call implicating a non-supported calling service. What is needed then is a technique, other than through (and preferably in addition to) the use of the IS-136.1 DCC Capability Report message, for a mobile station to provide the network with information on mobile station supported calling services.

SUMMARY OF THE INVENTION

Communication of information concerning mobile station supported calling services is made by a mobile station using a reverse digital traffic channel (DTC) message. In this message, the mobile station provides an indication with respect to supported calling services. For supported data calling services, in particular, the mobile station identifies whether it supports, for example, asynchronous data communication, G3Fax communication, half rate DTC communication, double rate DTC communication, triple rate DTC communication, STU-III, or asymmetrical bandwidth communication. A fast associated control channel (FACCH) of the reverse digital traffic channel may be used by the mobile station in communicating the supported calling services information. Using this information, the network may more efficiently page a mobile station in response to an incoming call implicating one of those data calling services. An appropriate forward digital traffic channel message may be sent by the network to the mobile station requesting transmission of the reverse message of the present invention which supplies the supported calling services information.

In a particular implementation of the present invention, the existing EIA/TIA Interim Standard IS-136.2 Capability Update Response message (see, IS-136.2 §2.7.3.1.3.2.23 (12/94)) is utilized, as modified with newly added parameters specifically directed to providing the network with information concerning mobile station supported calling services. Specifically, the added parameters of this message provide an indication of mobile station support of data calling services such as asynchronous data communication, G3Fax communication, half rate DTC communication, double rate DTC communication, triple rate DTC communication, STU-III, or asymmetrical bandwidth communication. The existing EIA/TIA Interim Standard IS-136.2 Capability Update Request message (see, IS-136.2 §2.7.3.1.3.2.22 (12/94)) is sent by the network to the mobile station requesting transmission of the reverse update response message of the present invention.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
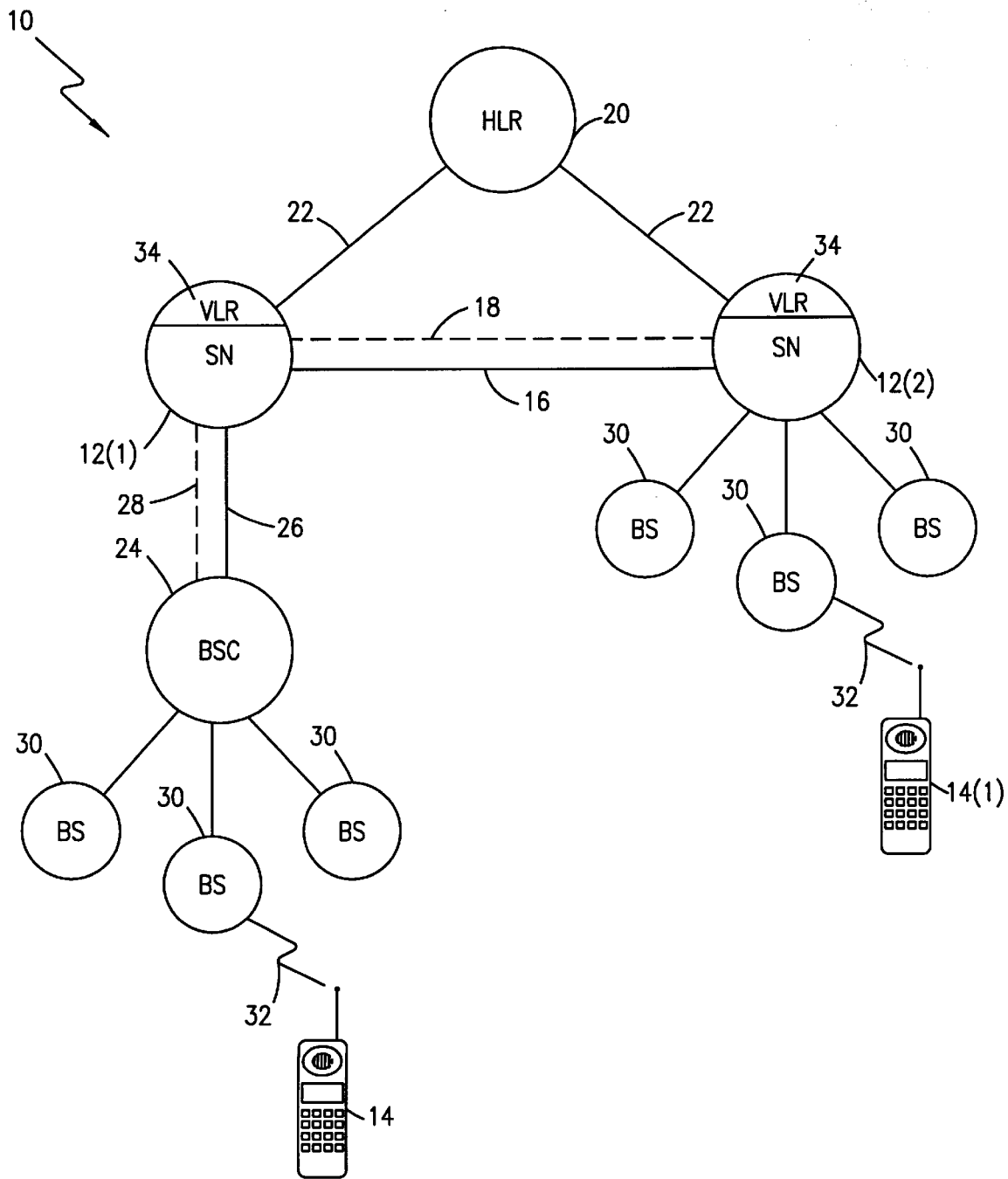
FIG. 1 is a schematic diagram of a cellular telephone network.

Reference is now made to FIG. 1 wherein there is shown a schematic diagram of a cellular telephone network 10 including a plurality of interconnected switching nodes (SN) 12. Although only two switching nodes 12 are shown, it will be understood that the network 10 likely includes many more interconnected nodes. The first and second switching nodes 12(1) and 12(2) may comprise any one of a number of known telecommunications switching devices, including mobile switching centers (MSC's), as commonly used and known in the art for providing digital cellular telephone service to a plurality of mobile stations (MS) 14. The switching nodes 12 are interconnected with each other for communication via both voice trunks 18 (illustrated with broken lines) and signaling links 16 (illustrated with solid lines) providing a known ISUP (or R1 or R2) type connection. The voice trunks 18 provide voice and data communications paths used to carry subscriber communications between the switching nodes 12. The signaling links 16 carry command signals between the switching nodes 12. These signals may be used, for example, in setting up and tearing down voice and data communications links over the voice trunks 18 and controlling the provision of calling services to the mobile stations 14. The switching nodes 12 are also connected to a home location register (HLR) data base 20 by means of signaling links 22 providing a known Mobile Application Part (MAP) or IS-41 type connection. The home location register 20 stores information concerning the mobile stations 14 comprising location information and service information. A subscriber record containing downloaded portions of the home location register 20 stored information, as well as information received from the mobile stations themselves, is maintained in a visitor location register (VLR) data base 34 associated with each switching node 12.

In one implementation, the switching nodes 12 are further connected to at least one associated base station controller (BSC) 24 via both a signaling link 26 and a voice trunk 28. Only one base station controller 24 is shown connected to the switching node 12(1) in order to simplify the illustration. The voice trunk 28 provides a voice and data communications path used to carry subscriber communications between the switching node 12(1) and its base station controller 24. The signaling link 26 carries command signals between the node 12 and its associated base station controller 24. The signaling link 26 and trunk 28 are collectively commonly referred to in the art as the "A interface". The base station controller 24 is then connected to a plurality of base stations (BS) 30 which operate to effectuate radio frequency communications with proximately located mobile stations 14 over an air interface 32. The base station controller 24 functions in a well known manner to control this radio frequency communications operation. In another implementation, the switching node 12(2) is connected directly to the plurality of base stations (BS) 30. The functionality provided by the base station controller 24 in controlling the radio frequency communications operation is then instead performed by the switching node 12(2).

Although direct communications links (signaling and/or trunk) are illustrated in FIG. 1, it is understood by those skilled in the art that the links are not necessarily direct between the illustrated nodes, and may instead pass through many other communications nodes (not shown) of the mobile network, and perhaps even utilize other communications networks (such as the public switched telephone network—PSTN). Illustration of the links in the "virtual" manner shown in FIG. 1 is therefore by way of simplification of the drawing. The cellular telephone network 10 may comprise a Global System for Mobile (GSM) communications, a digital Advanced Mobile Phone System (D-AMPS), a code division multiple access (CDMA) system, or the like.

Figure 2:
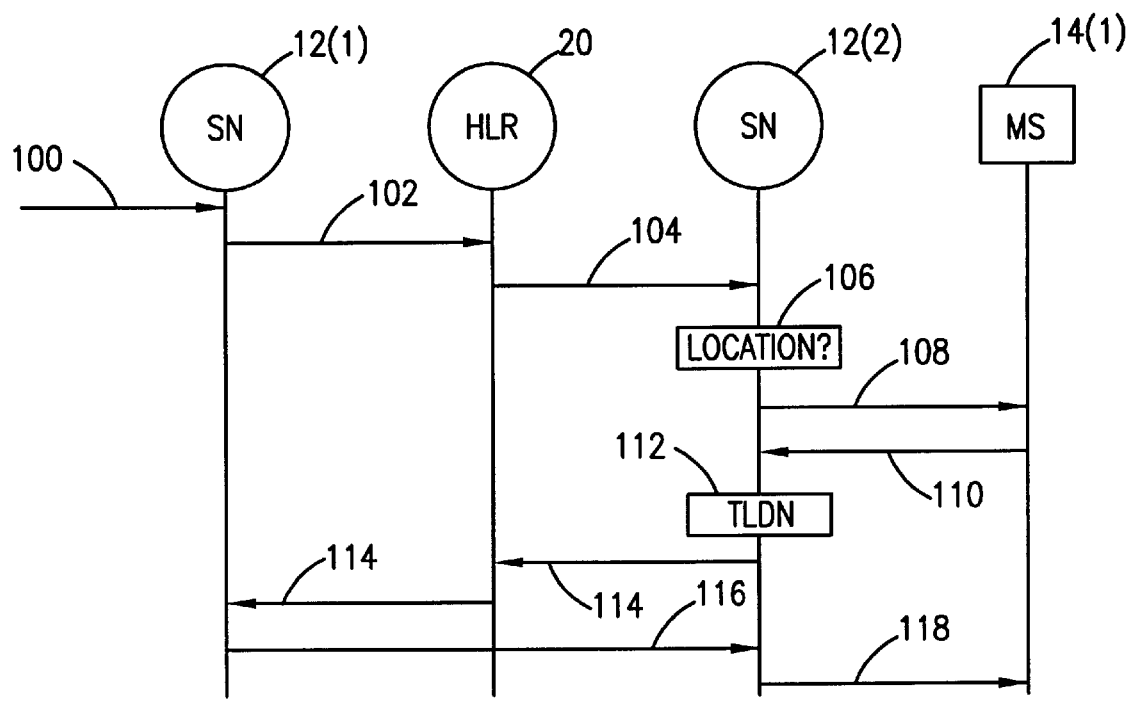
FIG. 2 is a signal flow and node operation diagram illustrating the flow of signals in connection with the prior art termination of an incoming call.

Reference is now made in combination to FIGS. 1 and 2, wherein FIG. 2 is a signal flow and node operation diagram illustrating the flow of signals in connection with a specific example of the prior art termination of an incoming call. A call 100 dialed to the directory number (B-number) of mobile station 14(1) originates from another cellular subscriber or the public switched telephone network (PSTN) and is received at the first (originating or gateway) switching node 12(1). Using the signaling link 22, the originating switching node 12(1) interrogates the home location register 20 with a location request (send routing) message 102. The location request (send routing) message 102 is processed by the home location register 20 to determine the location (i.e., second or serving switching node 12(2)) within the cellular network 10 of the called mobile station 14(1). Responsive to this interrogation, the home location register 20 signals the serving switching node 12(2) for the called mobile station 14(1) over signaling link 22 with a routing request (provide roaming) message 104 to prepare for the call. The serving switching node 12(2) then determines in action 106 two things. First, the serving switching node 12(2) determines whether a particular calling service implicated by the incoming call 100 is supported by the called mobile station 14(1). Thus, for example, if the call implicates a data service, and in particular a facsimile communication, the serving switching node 12(2) determines whether the called mobile station 14(1) supports facsimile data service communications. Second, the serving switching node 12(2) determines whether the location (for example, location area) of the called mobile station 14(1) is known. This location may be identified, for example, based on information resulting from a most recent registration (not shown) of the called mobile station 14(1) as stored in the visitor location register (VLR) data base 34 associated with the serving switching node 12(2). If the called mobile station 14(1) supports the implicated calling service, the serving switching node 12(2) then pages 108 for the called mobile station 14(1) in the known location, and processes a page acknowledgment 110 to make a more precise (cell) location determination. In accordance with this determined location, the serving switching node 12(2) selects in action 112 an appropriate routing number (for example, a temporary location directory number (TLDN) or a roaming number) for that location (for example, taking in consideration LATA borders and other concerns). In this instance, the routing number is selected from a plurality of such numbers associated with the serving switching node 12(2). The selected routing number is then returned 114 to the originating switching node 12(1) via the home location register 20. The incoming call is then delivered (through connected) 116 over the voice trunk 18 using the routing number to the serving switching node 12(2) for attempted completion to the called mobile station 14(1). Completion of the call involves further routing 118 the incoming call to the currently serving base station 30, and then to the called mobile station 14(1) over the air interface 32. If, on the other, the serving switching node 12(2) determines in action 106 that the called mobile station 14(1) cannot support the implicated calling service, a mobile station not available message is returned 114 to the originating switching node 12(1) via the home location register 20. Delivery of the incoming call 100 to the called mobile station 14(1) is then terminated.

Figure 3:
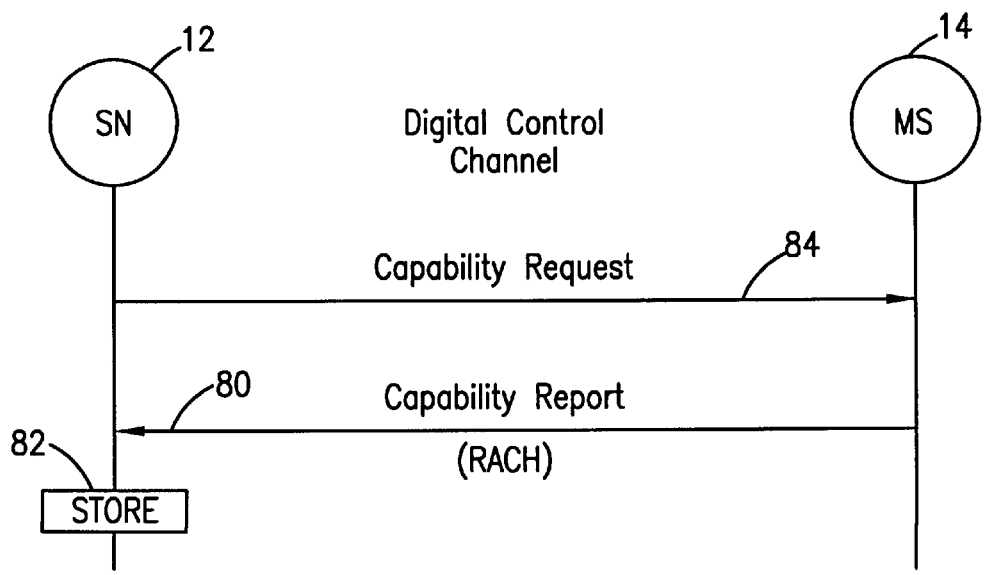
FIG. 3 is a signal flow and node operation diagram illustrating the flow of signals in connection with mobile station communication of supported calling services information using a reverse digital control channel message.

The serving switching node 12(2) determination in action 106 as to whether the called mobile station 14(1) supports the particular calling service implicated by the incoming call 100 is made by analyzing information stored in the subscriber record maintained for each served mobile station 14 in the visitor location register 34. The information concerning supported calling services is obtained from the mobile stations 14 themselves, typically at the time of mobile station registration. For example, as illustrated in FIG. 3 with respect to a cellular telephone network 10 implementing EIA/TIA Interim Standard IS-136 to define air interface 32 communications, the mobile station 14 may send a "Capability Report" message 80 on the random access channel (RACH) of the reverse digital control channel (DCC) at the time of mobile station registration. See, IS-136.1 §6.4.4.5 (12/94). This message is sent through the base station to the serving switching node. A suitable equivalent reverse digital control channel message is sent by mobile stations in non-IS-136 implementations. In this DCC Capability Report message 80, the mobile station 14 supplies the network with information concerning, among other things, its capabilities with respect to supporting calling services such as data services. For data services in particular, using the DCC Capability Report message 80, the mobile station 14 may identify whether it supports, for example, asynchronous data communication, G3Fax communication, half rate DTC communication, double rate DTC communication, triple rate DTC communication, STU-III, or asymmetrical bandwidth communication. This information is stored (action 82) by the serving switching node 12 in the subscriber record maintained by the visitor location register 34. Mobile station communication of the Capability Report message 80 may also be prompted by mobile station 14 receipt of a "Capability Request" message 84 transmitted from the switching node 12 on the forward digital control channel. See, IS-136.1 §6.4.3.5 (12/94). Again, an appropriate equivalent forward digital control channel request message is sent to mobile stations in non-IS-136 implementations.

Figure 4:
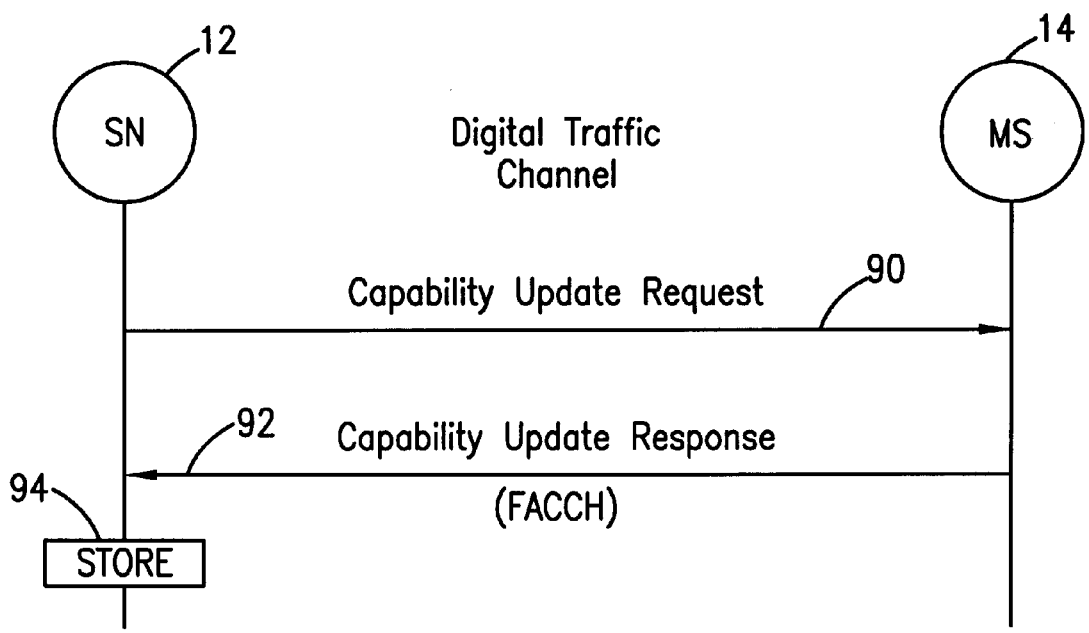
FIG. 4 is a signal flow and node operation diagram illustrating the flow of signals in connection with mobile station communication of protocol and service capability information using a reverse digital traffic channel message.

The network may also obtain while providing a calling service to a mobile station on a digital traffic channel, an update of protocol and service capabilities concerning the mobile station. For example, as illustrated in FIG. 4 with respect to a cellular telephone network 10 implementing EIA/TIA Interim Standard IS-136 to define air interface 32 communications, a "Capability Update Request" message 90 is sent from the switching node 12 to the mobile station 14 on the forward digital traffic channel (DTC). See, IS-136.2 §2.7.3.1.3.2.22 (12/94). This message is sent to the mobile station through the serving base station. A suitable equivalent forward digital traffic channel message is sent to mobile stations in non-IS-136 implementations. Responsive thereto, the mobile station 14 sends a "Capability Update Response" message 92 on the fast associated control channel (FACCH) of the reverse digital traffic channel during the provision of a calling service. See, IS-136.2 §2.7.3.1.3.2.23 (12/94). This message is sent to the switching node through the serving base station. Again, an appropriate equivalent reverse digital traffic channel response message is sent by mobile stations in non-IS-136 implementations. In this DTC Capability Update Response message 92, the mobile station 14 supplies the network with information concerning, among other things, its protocol and service capabilities as they relate to, for example, frequency band support, voice coder support and voice privacy support. This information is stored (action 94) by the serving switching node 12 in the subscriber record maintained by the visitor location register 34.

It is recognized that situations may arise where the calling services support information obtained by the network from the mobile station 14 in the Capability Report message sent at registration over the digital control channel may become lost (perhaps due to a recycling of the visitor location register 34 stored subscriber record), or may not be obtained at all from registration because the mobile station has camped-on to an analog (as opposed to digital) control channel (ACC). The present invention proposes modifying the EIA/TIA Interim Standard IS-136 "Capability Update Response" message 92 (see, FIG. 4, and IS-136.2 §2.7.3.1.3.2.23 (12/94)) to include not only protocol and service capability information as it relates to, for example, frequency band support, voice coder support and voice privacy support, but also information relating to the calling services supported. Equivalent modifications to the reverse digital traffic channel response message are also proposed by the present invention for non-IS-136 implementations. In particular, the message 92 is modified to include information supported data services, such as, asynchronous data communication, G3Fax communication, half rate DTC communication, double rate DTC communication, triple rate DTC communication, STU-III, or asymmetrical bandwidth communication.

Figure 5:
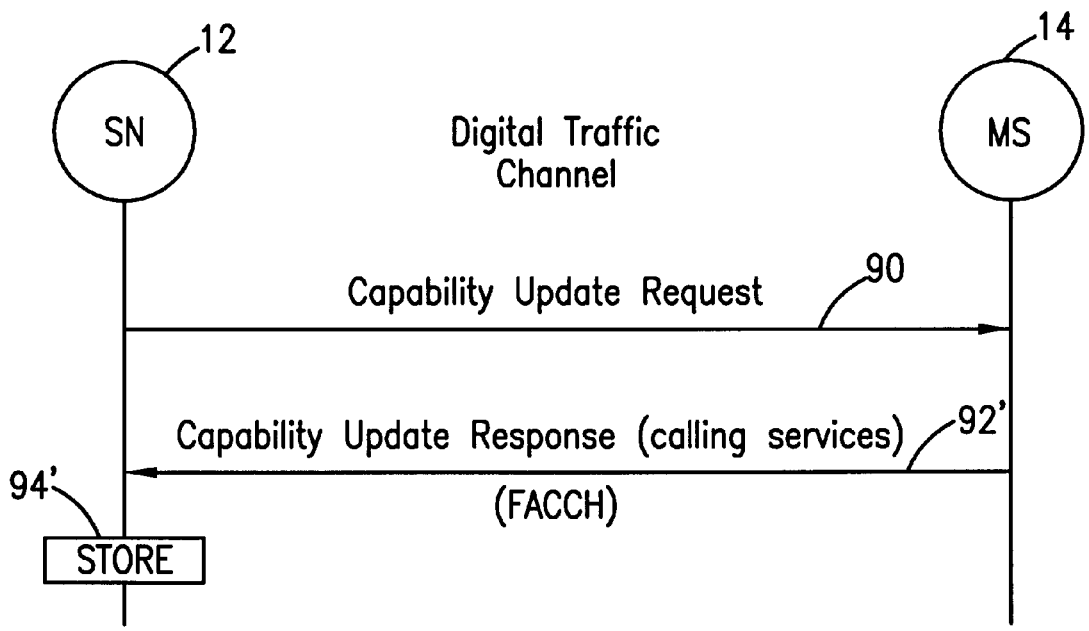
FIG. 5 is a signal flow and node operation diagram illustrating the flow of signals in connection with mobile station communication of not only protocol and service capability information, but also supported calling services information, using a reverse digital traffic channel message.

With reference now to FIG. 5 in the context of a cellular telephone network 10 implementing EIA/TIA Interim Standard IS-136 to define air interface 32 communications, a "Capability Update Request" message 90 is sent from the switching node 12 to the mobile station 14 on the forward digital traffic channel (DTC). See, IS-136.2 §2.7.3.1.3.2.22 (12/94). This message is sent to the mobile station through the serving base station. A suitable equivalent forward digital traffic channel message is sent to mobile stations in non-IS-136 implementations. Responsive thereto, the mobile station 14 sends a "Capability Update Response" message (modified) 92' on the fast associated control channel (FACCH) of the reverse digital traffic channel during the provision of a calling service. This message is sent to the switching node through the serving base station. Again, an appropriate equivalent reverse digital traffic channel response message (modified) is sent by mobile stations in non-IS-136 implementations. The Capability Update Response (modified) message 92' includes information concerning not only its protocol and service capabilities as they relate to, for example, frequency band support, voice coder support and voice privacy support (see, IS-136.2 §2.7.3.1.3.2.23 (12/94)), but also information on supported calling services such as data services like that information which is provided on the reverse digital control channel by the IS-136 Capability Report message (IS-136.1 §6.4.4.5 (12/94)). For data services in particular, using the DTC Capability Update Response (modified) message 92', includes information on whether the mobile station 14 supports, for example, asynchronous data communication, G3Fax communication, half rate DTC communication, double rate DTC communication, triple rate DTC communication, STU-III, or asymmetrical bandwidth communication. This information is stored (action 94') by the serving switching node 12 in the subscriber record maintained by the visitor location register 34. It is then accordingly available for analysis (see, action 106 or FIG. 1) in connection with a serving switching node determination to page a called mobile station in response to an incoming call implicating one of the calling services.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. In connection with a cellular telephone network supporting different kinds of calling services for mobile stations, a method for communicating information from a given mobile station identifying the calling services supported by that given mobile station comprising the step of sending a capability message to the cellular telephone network from the given mobile station over an air interface and on a reverse digital traffic channel, the capability message including information identifying the calling services supported by the given mobile station.

2. The method as in claim 1 wherein the step of sending comprises the step of sending the capability message to a switching node of the cellular telephone network currently serving that given mobile station.

3. The method as in claim 1 wherein the reverse digital traffic channel comprises a fast associated control channel, and wherein the step of sending comprises the step of sending the capability message on the fast associated control channel.

4. The method as in claim 1 wherein the calling services comprise voice calling services and data calling services, and the information of the capability message identifies which data calling services are supported by the given mobile station.

5. The method as in claim 4 wherein the data calling services comprise at least one service selected from the group of asynchronous data communication, G3Fax communication, half rate DTC communication, double rate DTC communication, triple rate DTC communication, and asymmetrical bandwidth communication.

6. With respect to a mobile station possessing capability for supporting only certain data calling services, a method for communicating information concerning those supported calling services to a serving cellular telephone network, comprising the steps of:
   sending a first capability message to the cellular telephone network over an air interface and on a reverse digital control channel, the capability message including information identifying the data calling services supported by the mobile station; and
   sending a second capability message to the cellular telephone network over the air interface and on a reverse digital traffic channel, the capability message including information identifying the data calling services supported by the mobile station.

7. The method as in claim 6 wherein the steps of sending comprise the steps of sending the first and second capability message to a switching node of the cellular telephone network currently serving the mobile station.

8. The method as in claim 6 wherein the reverse digital traffic channel comprises a fast associated control channel, and wherein the step of sending comprises the step of sending the second capability message on the fast associated control channel.

9. The method as in claim 8 wherein the reverse digital control channel comprises a random access channel, and wherein the step of sending comprises the step of sending the first capability message on the random access channel.

10. The method as in claim 6 wherein the data calling services comprise at least one service selected from the group of asynchronous data communication, G3Fax communication, half rate DTC communication, double rate DTC communication, triple rate DTC communication, and asymmetrical bandwidth communication.

11. A cellular telephone network, comprising:

a switching node operating to store, in a subscriber record for a given mobile station maintained in a visitor location register associated with the switching node, information identifying calling services supported by that given mobile station; and a base station connected to the switching node and in radio frequency communication with the given mobile station over an air interface, the base station receiving from the given mobile station and sending to the switching node for storage in the subscriber record the information identifying calling services supported by that given mobile station, wherein the information is received by the base station from the given mobile station in a given mobile station transmitted capability message sent over the air interface on a reverse digital traffic channel.

12. The network as in claim 11 wherein the reverse digital traffic channel comprises a fast associated control channel, and wherein the capability message is received by the base station over the fast associated control channel.

13. The network as in claim 11 wherein the calling services comprise voice calling services and data calling services, and the capability message includes information identifying which data calling services are supported by the given mobile station.

14. The network as in claim 13 wherein the data calling services comprise at least one service selected from the group of asynchronous data communication, G3Fax communication, half rate DTC communication, double rate DTC communication, triple rate DTC communication, and asymmetrical bandwidth communication.

\* \* \* \* \*